L. J. McMILLIN.
CORN SHELLER.
APPLICATION FILED JAN. 16, 1909.
932,889.
Patented Aug. 31, 1909.
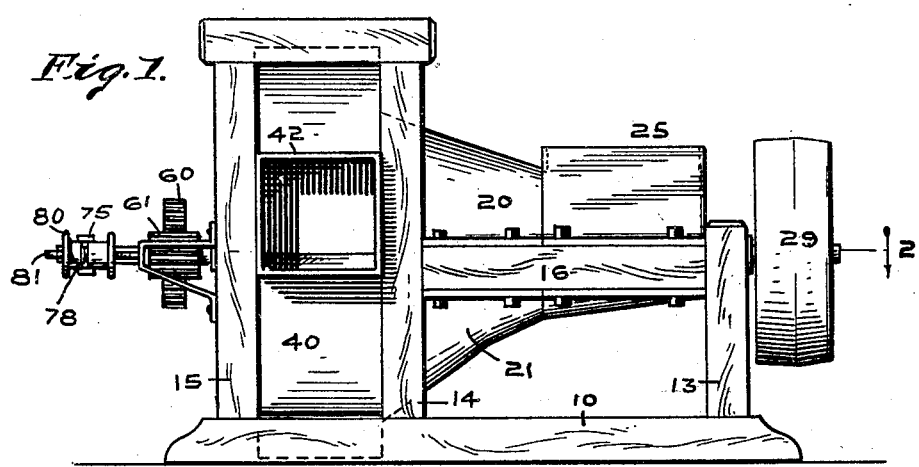
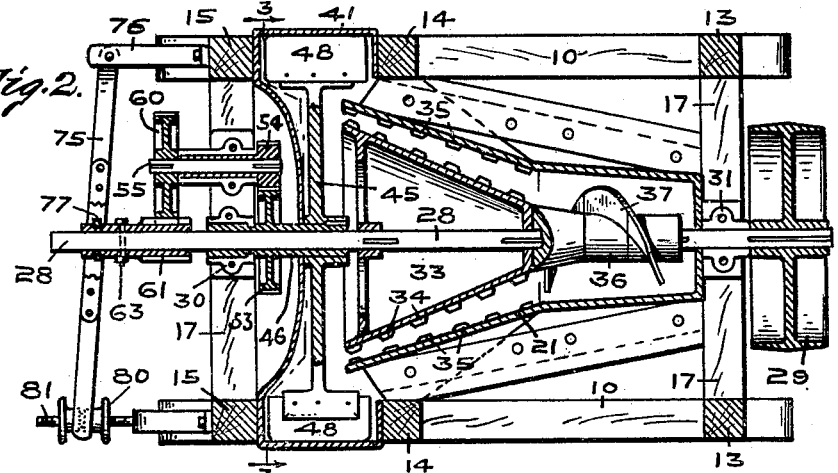
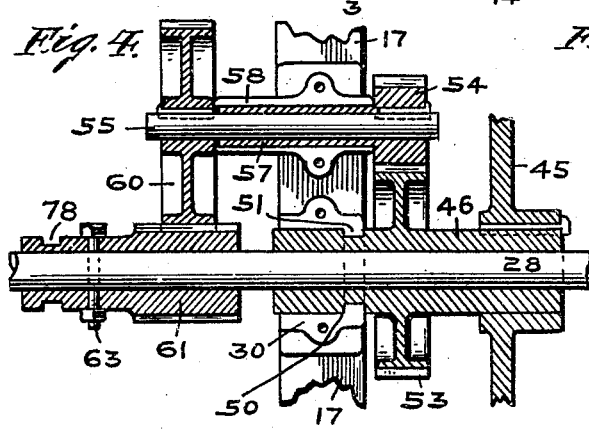
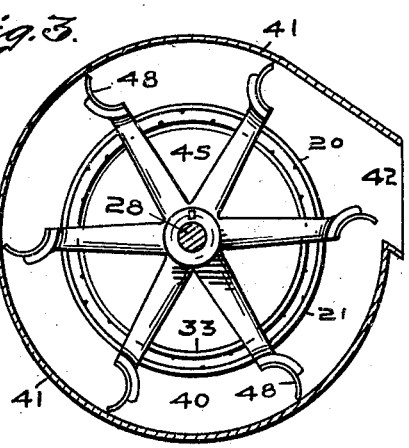
WITNESSES:
INVENTOR
Louis J. McMillin
By Minturn T. Koerner
ATT'YS.

UNITED STATES PATENT OFFICE.

LOUIS J. McMILLIN, OF INDIANAPOLIS, INDIANA.

CORN-SHELLER.

932,889.  Specification of Letters Patent.  Patented Aug. 31, 1909.

Application filed January 16, 1909. Serial No. 472,657.

*To all whom it may concern:*

Be it known that I, LOUIS J. MCMILLIN, a citizen of the United States, residing at Indianapolis, in the county of Marion and State of Indiana, have invented certain new and useful Improvements in Corn-Shellers, of which the following is a specification.

This invention relates to corn shellers of the type employing grain-discharge blades for engaging and discharging the shelled-corn from the sheller casing. Machines of this character as shown, for instance, in U. S. Letters Patents Nos. 802,273 dated October 17, 1905, and 905,259, dated December 1, 1908, have grain-discharge blades either attached to the inner conically shaped member of the sheller or to a spider, in both instances however the blades are driven at the same high rotation of speed as that of sheller member and the drive shaft. These grain-discharge blades when driven at a high speed crack a large percentage of the grains, thereby reducing the commercial value of the corn besides incurring the additional expense involved in re-cleaning in order to extract or separate the injured grains from the others. Another objectionable feature attends the high rotation of the blades and that is the creation of a strong blast of air which is discharged with the grain in a manner that it cannot be confined.

The object of this invention is to provide means for the above mentioned shellers whereby the grain-discharge blades are rotated at a greatly reduced speed than that of the drive shaft and inner sheller member, so that the danger of cracking and injuring the grains of corn is correspondingly reduced and the elimination of the dust extended.

A further object of the invention is to provide means whereby the inner sheller member may be adjusted with relation to the sheller casing to adapt the machine to the size and conditions of the ears of corn, without changing the position of the grain-discharge blades and other mechanism.

I accomplish the objects of the invention by means of the corn sheller illustrated in the accompanying drawings, forming a part hereof, in which—

Figure 1 is a front elevation of the corn sheller. Fig. 2 a horizontal sectional view on the line 2—2 in Fig. 1. Fig. 3 is a cross section on the line 3—3 in Fig. 2. Fig. 4 is an enlarged horizontal sectional view through the central portion of the gear mechanism.

Referring to the drawings, 10 represents the base members of the frame to support the uprights 13, 14 and 15.

16 represents the horizontal members of the frame and 17 the transverse members thereof. The sheller consists of the conically shaped outer casing members 20 and 21 which are removably secured in a suitable manner to the frame of the machine. The member 20 is provided with the feed-opening 25 which forms the mouth leading to the hopper into which the corn is fed. Mounted centrally and in a longitudinal manner within the members 20 and 21 is the drive shaft 28, supported in the journal-boxes 30 and 31, which are secured to the transverse members 17 of the frame. The shaft 28 is provided with the pulley 29 to which power is applied for operating the sheller. The sheller includes the conically-shaped member 33 which is rigidly mounted on shaft 28 and is provided on its periphery with the lugs 34. These lugs correspond to the lugs 35 formed on the internal surfaces of the outer casing members 20 and 21 and collectively operate to remove the grain from the cob, when the member 33 is rotated. Rigidly mounted on shaft 28 in advance of the member 33 is the sleeve 36 which is provided with the integral conveyer blade 37 which removes the corn from the hopper and feeds same to the sheller.

As the grain is removed from the cob it falls upon the internal inclined surface of the sheller casing 21 from whence it is directed and discharged by gravity into the chamber 40 formed by the housing 41; the latter being mounted adjacent to the diverging or delivering end of the inclined surface of the casing 21 to receive said discharged grain. The housing 41 is provided with the outlet opening 42 and forms an inclosure for the means which elevates and discharges the grain from the machine. This grain removing means consists of a spider 45 which is keyed to the sleeve 46, the latter being loosely mounted on the drive shaft 28. The outer end of each arm of said spider is provided with a grain-bucket 48, preferably concave as shown, by which the grain is elevated from the bottom of the housing 40 and discharged through the opening 42 when the said spider is rotated in the desired direction. The sleeve 46, carrying the spider 45, is held against longitudinal movement on the shaft 28 by means of an annular groove 50 engaging a corresponding rib 51 formed on the journal-box 30. The sleeve 46 is also provided with a fixed pinion 53 which engages the smaller pinion 54 rigidly secured to the shaft 55. The pinion 54 is provided with the extended hub 57 which projects through the journal-box 58, secured to the transverse member 17 of the frame, so that a firm bearing for said pinion is secured. The end of the shaft 55 opposite the one which carries the pinion 54 is provided with the pinion 60 which meshes with the smaller pinion 61, the latter pinion being rigidly secured to the drive-shaft 28 by means of the transverse bolt 63. The arrangement and diversity of diameters of the pinions 53, 54, 60 and 61 causes the spider 45, carrying the grain-buckets 48, to rotate more slowly than the drive-shaft 28 and thus greatly reduce the liability of the grains being cracked and injured.

In machines of the above described character it is ofttimes desirable to change the position of the inner member 33 of the sheller with respect to the outer casings 20 and 21 so that the effectiveness of the sheller may be maintained with the varying conditions of the corn. This adjustability of the sheller 33 is secured by shifting the drive-shaft 28 longitudinally. This longitudinal movement of the shaft 28 is accomplished by means of the shifting lever 75 which is pivoted to the bracket 76, and carries the collar 77 which engages the annular groove 78 in the hub of the pinion 61 which pinion, as heretofore mentioned, is rigidly connected with said shaft by means of the bolt 63. The pinion 61 is of sufficient length to permit the drive-shaft 28 to be moved longitudinally without being disengaged from the pinion 60. The opposite end of the shifting-lever 55 engages the spool 80 which is mounted on the threaded shaft 81, and by the rotation of said spool the shaft 28 is moved and held in desired position.

Having thus fully described my said invention what I desire to secure by Letters Patent, is—

1. A machine of the above specified class comprising a grain-sheller casing, a grain sheller revolubly mounted within said casing, a revoluble support for said grain sheller, a grain discharge means loosely mounted on said revoluble support, and means operatively associated with said revoluble support and adapted to impart a reduced movement of rotation to said grain-discharge means.

2. A machine of the above specified class comprising a grain-sheller casing, a grain sheller revolubly mounted within said casing, a revoluble support for said grain sheller, a housing, adapted to receive the shelled corn, mounted adjacently to said discharge end of said sheller casing, said housing being provided with an opening, a grain-discharge means located within said housing and loosely mounted on the revoluble support for the grain sheller, and means operatively associated with said revoluble support and adapted to impart a reduced movement of rotation to said grain-discharge means.

3. A machine of the above specified class comprising a grain-sheller casing, a grain sheller revolubly mounted within said casing, a revoluble support for said grain sheller, a housing communicating with the discharge end of said casing, a grain discharge located within said housing and loosely mounted on said revoluble support, means adapted to prevent longitudinal movement of said grain discharge, and means operatively associated with said revoluble support and adapted to impart a reduced movement of rotation to said grain-discharge.

4. A machine of the above specified class comprising a grain-sheller casing, a grain sheller revolubly mounted within said casing, a revoluble support for said grain sheller, a grain discharge means mounted independently of said revoluble support, means operatively associated with said revoluble support and adapted to impart a reduced movement of rotation to said grain-discharge means, and shifting means adapted to longitudinally move the revoluble support independently of said grain-discharge means.

5. A machine of the above specified class comprising a grain-sheller casing, a grain sheller revolubly mounted within said casing, a revoluble support for said grain sheller, a grain discharge means mounted independently of said revoluble support, means operatively associated with said revoluble support and adapted to impart a reduced movement of rotation to said grain-discharge means, shifting means adapted to longitudinally move the revoluble support independently of said grain-discharge means, and means for securing said shifting means in the desired position.

6. A machine of the above specified class comprising a grain-sheller casing having a flared end to provide a discharge therefor, a grain sheller revolubly mounted within said casing, a revoluble supporting shaft for mounting said grain sheller, a grain receiving chamber arranged adjacently to the discharge end of the sheller casing and adapted to receive the grain discharged from said casing, a grain-discharge means arranged within the grain receiving chamber and mounted loosely on the supporting shaft at one side of a transverse plane through said sheller casing, and means operatively associated with said revoluble shaft and adapted to impart a reduced movement of rotation to said grain-discharge means.

In witness whereof, I have hereunto set my hand and seal at Indianapolis, Indiana, this 9th day of January, A. D. one thousand nine hundred and nine.

LOUIS J. McMILLIN. [L. S.]

Witnesses:
L. B. WOERNER,
F. W. WOERNER.